April 2, 1968  R. J. DORN  3,375,878
TRACTOR AUGER-TYPE BACKFILLER
Filed June 30, 1965  2 Sheets-Sheet 1

INVENTOR
Russell John Dorn
BY
Ralph F. Crandell
ATTORNEY

April 2, 1968

R. J. DORN 3,375,878

TRACTOR AUGER-TYPE BACKFILLER

Filed June 30, 1965

INVENTOR
*Russell John Dorn*
BY
*Ralph F. Crandell*
ATTORNEY

United States Patent Office

3,375,878
Patented Apr. 2, 1968

3,375,878
TRACTOR AUGER-TYPE BACKFILLER
Russell John Dorn, Aurora, Colo., assignor to Arrow Manufacturing Company, Denver, Colo., a corporation of Colorado
Filed June 30, 1965, Ser. No. 468,229
3 Claims. (Cl. 172—71)

ABSTRACT OF THE DISCLOSURE

The disclosed invention is an auger-type backfiller for a tractor. The backfiller comprises an elongated material handling unit assembly, including a revolvable auger, means operatively mounting the assembly on one end of the tractor in lateral outward projection at one side thereof and with the auger presented for ground engagement, and means for adjusting the altitude and tilt of the assembly with respect to the tractor.

---

This invention relates to adjunctive equipment suited for operative association with self-powered, automotive vehicles, to supplement and extend the utility of the vehicle without impairment of its primary capabilities. More particularly this invention relates to an auger-type organization adapted for use with a vehicle of conventional tractor type provided with a hydraulic, pressure-fluid system, and capable of applying the hydraulic power supply of the vehicle for backfilling, and analogous, operations.

The principal object of the invention is to provide a novel and improved backfiller unit that is arranged for assembly in operative attachment to a tractor without significant alteration of tractor elements and components.

Another object of this invention is to provide a novel and improved backfiller unit that is expedient of operative correlation with a tractor.

A further object of the invention is to provide a novel and improved backfiller unit that when attached to a tractor, is susceptible of prompt and convenient application to and retraction from intended use relation with its mount.

Still another object of the invention is to provide a novel and improved backfiller unit that is feasible of ready adaptation to use in front-mounted or rear-mounted association with conventional tractors of diverse structural particularity.

A further object of the invention is to provide a novel and improved backfiller unit that is amenable in attachment to a tractor to adjustment of its effective attitude laterally of the tractor.

Still a further object of the invention is to provide a novel and improved backfiller unit that is suited for full, operative control when attached to a tractor, through simple connections served by the hydraulic system of the tractor.

A further object of the invention is to provide a novel and improved construction and intercorrelation of elements and features constituting a backfiller unit attachable to a tractor.

A further object of the invention is to provide an auger-type backfiller attachment for tractors that is expedient of economical production, facile of cooperative association with a tractor, functionally efficient over a variable range of practical utility, responsive to convenient control in powered connection with the hydraulic pressure system of the tractor, and durably reliable in positive attainment of the ends for which designed.

With the foregoing and other objects in view, the invention resides in the form, construction, and operative combination of elements and features as hereinafter set forth, pointed out in the appended claims, and illustrated by the accompanying drawings, wherein:

Figure 1:
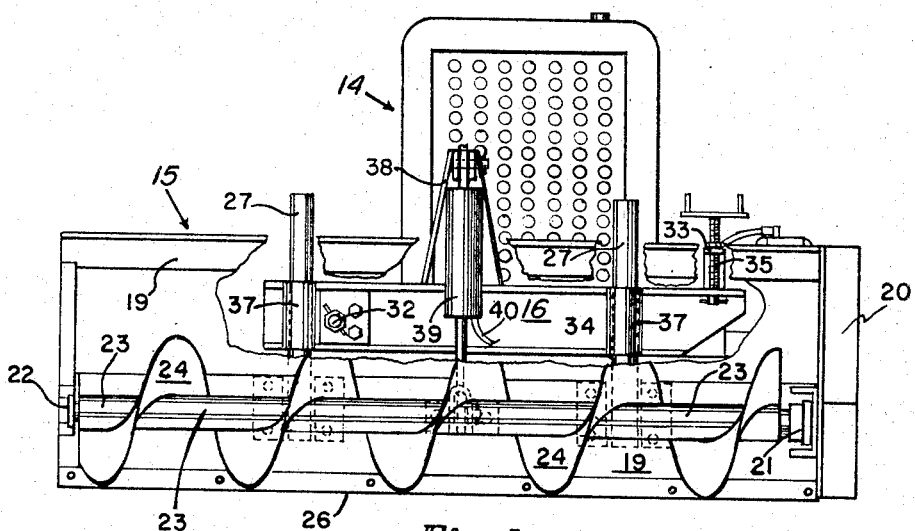
FIGURE 1 is an elevational view of a typical embodiment of the invention as associated for use with a tractor, portions of the view being broken away to reveal otherwise concealed relationships.
Figure 2:
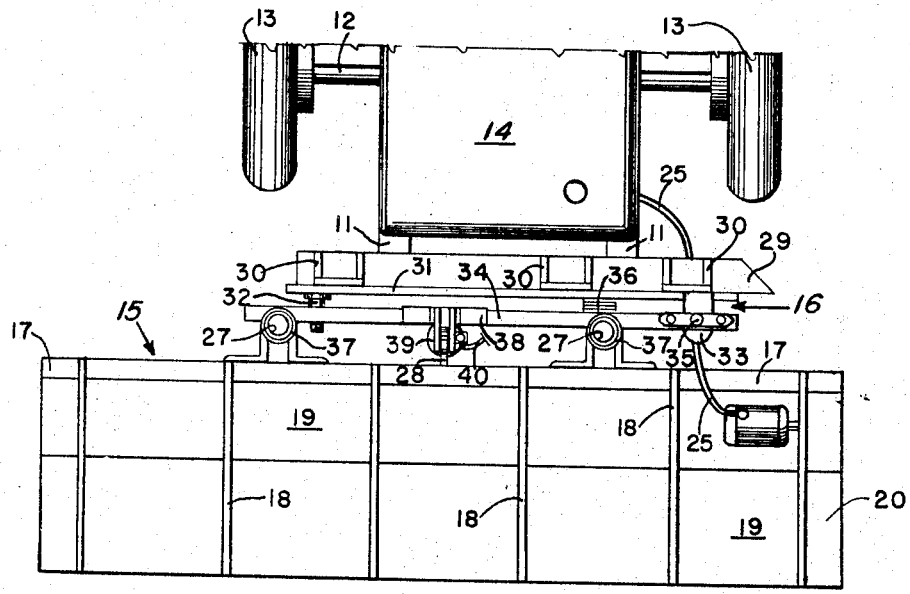
FIG. 2 is a top plan view of the arrangements according to FIG. 1 showing but fragmentarily the associated portion of a tractor.
Figure 3:
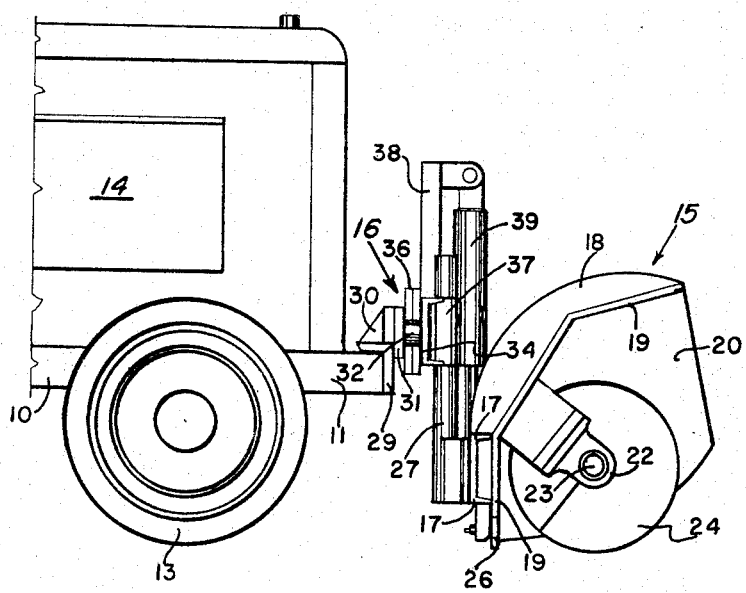
FIG. 3 is an end elevational view of the arrangements according to FIGS. 1 and 2 as seen from the left-hand end thereof.
Figure 4:
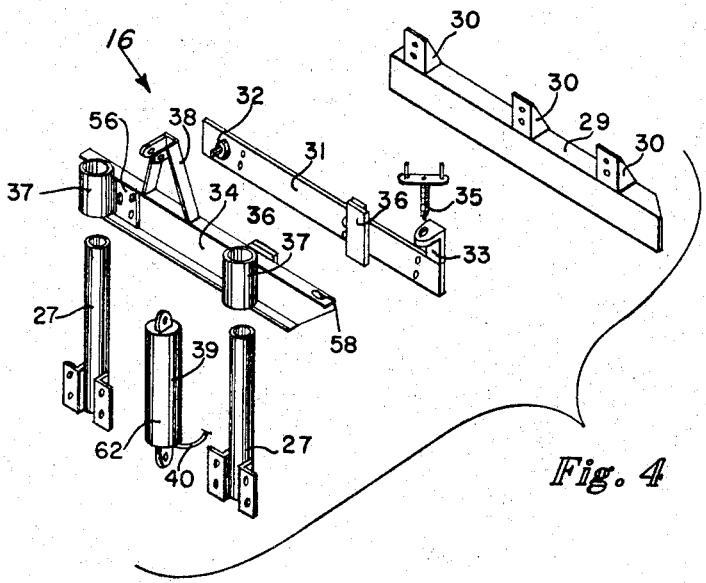
FIG. 4 is an exploded view of the separate elements and features coactable as represented to operatively couple an auger unit to the tractor in accordance with the principles of the invention and the preceding views.

The economic merit and practical advantages of adapting tractor-type automotive vehicles for multiple specific uses have long been recognized, and it being abundantly manifest that the utility of tractors applied to facilitate many construction operations is much enhanced by the availability of a backfiller attachment translatable with and powered by the tractor, the instant invention is directed to the provision of a unitary facility suited for attachment to conventional tractors of varying structural particularity and operable, as so attached, to shift loose material laterally from the travel path and to one side of the associated tractor to effect, for example, return of excavated material to a ditch from which it has been taken, and consequent performance of what are termed backfilling operations.

Fragmentarily and diagrammatically illustrated but to the extent requisite for understanding of the present invention, the tractor represented in several views of the drawings is but exemplary of equivalent self-propelled vehicles, equipped with hydraulic pressure systems and having, as is conventional, a rigid main frame 10 formed or furnished with end extensions 11 supported by dirigible translation in generally-horizontal disposition by axles 12 and wheels 13, or their functional equivalents, a prime mover carried by the frame, as within a housing 14, and a regulable supply of hydraulic pressure typified by the lines and connections hereinafter itemized, whereby to qualify in every essential respect for functional cooperation with the backfiller improvement of the present invention.

In realization of the concept and principles of the invention the improved auger-type backfiller is constituted as a unitary material-handling assembly designated generally by the numeral 15 and an attachment assembly, designated generally by the numeral 16, for operatively relating the assembly 15 with, and mounting the same on, the tractor.

In a length adequate to span laterally across and extend at one end beyond the tractor whereto applied, the assembly 15 is developed on and in unitary association with a beam 17, a plurality of arcuate ribs 18 fixedly spaced apart therealong and to outstand in registration longitudinally thereof perpendicularly therefrom, a concavo-convex, longitudinally-continuous hood 19 affixed to said beam and within said ribs with its concavity open away from the beam and ribs, a drive housing 20 mounting a journal 21 transversely of and closing one end of the hood 19, a journal 22 fixed at the other, and open end, of said hood in alignment with the journal 21, a shaft 23 carrying an auger flight 24 end-engaged for rotation in the journals 21 and 22, an hydraulic power drive, not shown, served by a pressure flow line 25 within the housing 20 selectively actuable under conventional controls to rotate the shaft 23 and auger flight 24, and a scraper blade 26 replaceably affixed parallel to the beam 17 to define with the lower arcs of the auger flight 24 a plane suited for ground engagement at times. Unitarily comprised as shown and described, the assembly 15 is conditioned for attachment to a tractor through the provision of a pair of like, straight guides 27 fixed in spaced, parallel relation to the side of the beam 17 remote from the auger flight 24 to upstand therefrom perpendicular to the plane established by the blade 26 and the lower arcs of said flight and by the presence of an apertured ear 28 fixed to project from the same side of the beam between the guides 27 at substantially the midlength of the assembly 15.

Manifestly susceptible of variation in structural detail and arrangement, the attachment assembly 16 is illustrated as characterized by a straight, rigid bar 29 fixedly spanning, in a horizontal disposition, transversely of the tractor between the end extensions 11 of the tractor frame 10, and supporting perpendicularly-related lugs 30 spaced apart longitudinally therealong to define therewith a vertical plane at and cross the end of the tractor. The lugs 30 in turn support, on their vertical faces, a thrust plate 31 fixed to said lugs to parallel the bar 29 at the side thereof remote from the tractor. Formed with a stud 32 fixedly projecting perpendicularly and outwardly adjacent one of its ends, and with an apertured lip 33 superjacently overhanging its other end, the plate 31 mounts a channel member 34 for relative pivotal adjustment in thrust engagement therewith. Said member 34 is articulated near one of its ends on the stud 32, a bearing plate 56 being provided to journal the stud 32. The member 34 is retained for altitudinal adjustment of its other end by operative connection with the lower end of a manually-actuatable screw 35 threaded through the lip 33, and conditioned for thrust coaction with a bearing area 58 on the plate 31 by means of slidably-related blocks 36 respectively carried by and filling the space between said plate and member. With this construction, the member 34 is qualified for optional tilt adjustment relative to and in maintained thrust-receiving association with the plate 31 fixed to the tractor. The member 34 serves directly and operatively to mount the material-handling assembly 15 on the tractor through the components of the attachment assembly 16 just described. In furtherance of this mounting, the said member 34 fixedly mounts sleeves 37 suited to slidably and telescopically accommodate the guides 27 of the assembly 15 in a spaced parallelism identical with that of said guides, and in a disposition perpendicular to the member 34 such as to offset the length of the assembly 15 laterally and to one side of the associated tractor when said guides are received in said sleeves. With the foregoing mounting organization, the assembly 15 is related to the member 34 so as to afford conjoint thrust reaction forward of the tractor, altitudinal relative play, and coincident optional tilt adjustment about the axis of the stud 32 in a stable parallel relation of the auger shaft 23, beam 17, and member 34. Completing the operative association of the assembly 15 with the member 34, a yoke 38 fixedly upstands from said member between the sleeves 37 to overhang, at its apex, the ear 28 carried by the beam 17 and support the upper end of a conventional hydraulic ram 39, served through a flow line 40 by the pressure system of the tractor in connection of its extensible and retractable component to the said ear 28, whereby regulation of the altitudinal attitude of the assembly 15 relative to the member 34 and tractor is controllable by the tractor operator in an expedient conventional manner.

Organized in operative association with a tractor as shown and described, the material-handling, auger-type assembly 15 functions under full control of the tractor operator as an efficient backfiller, employable at option to shift loose material from and to one side of the path of tractor. When use of the assembly 15 is not desired, the ram 39 is operated to lift and hold the assembly away from near approach to the surface on which the tractor is operating, thus freeing the tractor for such other uses as may be within its capabilities. Alternatively, it being opportune to utilize the assembly 15, as, for example, to return excavated material to a bordering ditch from which it has been removed, the tractor is directed on a path of travel parallel to the ditch, with the lateral offset of the assembly overhanging the ditch. The relative tilt of the assembly as lowered to ground-engagement by the ram 39 is adjusted by means of the screw 35 to appropriate conformity with terrain conditions. The drive of the shaft 23 and auger 24 is energized as the tractor is advanced to rotate the auger flight for translation of encountered material from the travel path and into the ditch, which the blade 26 impels and accumulates the material for engagement by the auger. Obviously, the improvement is applicable to uses other than backfilling of ditches, and is available to smooth, even, spread, and distribute loose material in numerous other applications.

Since changes, variations, and modifications in the form, construction, and arrangement of the elements and features shown and described may be had without departing from the spirit of the invention, it should be understood that the scope of the invention is limited solely by the scope of the appended claims, rather than by any details of the illustrative showing and foregoing description.

I claim as my invention:

1. In a backfiller for a tractor having a main frame powered and supported for translation in generally-horizontal disposition and a hydraulic pressure system, an elongated material-handling unit assembly having a beam supporting an auger for rotation in spaced parallelism therewith, and a drive selectively-actuatable in powered relation with the hydraulic system of the tractor to rotate said auger, means operatively correlating said assembly with the tractor, said means comprising straight guides fixed perpendicular to said beam in spaced parallelism, a bar rigid with and transverse of one end of the tractor frame, a thrust plate affixed to said bar in a facing away from the tractor, a rigid member pivotally connected adjacent one end to said thrust plate in overlying, bearing engagement therewith for relative angular adjustment through a vertical arc, a selectively-actuatable screw operatively coupling relatively-movable, contiguous portions of said plate and member remote from their pivotal conjunction in regulable determination of their angular correlation, sleeves transverse of said member fixed thereto for sliding coaction with the guides secured to the beam, and a hydraulic ram selectively-actuatable in powered relation with the hydraulic system of the tractor linking said member and beam between and parallel to the sleeve-engaged guides.

2. An auger-type backfiller organization for a tractor having a main frame supported and powered for translation in generally horizontal disposition and a hydraulic pressure system, said backfiller comprising, in combination, an elongated material handling unit assembly having a beam longitudinally thereof supporting and operatively correlating an auger revolvable parallel thereto, a hood partially embracing the auger, a scraper blade parallel to the auger, and a hydraulic drive for rotation of the auger; means operatively connecting said assembly to the tractor constituted as straight guides fixed perpendicular to said beam in spaced parallelism, a bar rigid with and transverse of one end of the tractor frame, a rigid member extending substantially parallel to said bar, means pivotally mounting said member on said bar for limited angular displacement in a vertical arc, selectively-actuatable means operatively coupling said member and said bar for variable determination of the angular relation therebetween, sleeves transverse of said member fixed thereto for sliding coaction with said guides secured to said beam, and a hydraulic ram operatively linking said member and said beam; and connection means for regulably powering the auger drive of the assembly and the ram intercoupling said member and said beam from the hydraulic system of the tractor; whereby said assembly is yoked in altitudinally-adjustable and tilt-adjustable relation to the tractor with the auger and scraper blade components presented for ground engagement transversely of the tractor.

3. An auger-type backfiller organization for a tractor having a main frame supported and powered for translation in generally horizontal disposition and a hydraulic pressure system, said backfiller comprising, in combination, an elongated material-handling unit assembly having a beam longitudinally thereof supporting and operatively correlating an auger revolvable parallel thereto, a hood partially embracing the auger, a scraper blade parallel to the auger, and a hydraulic drive for rotation of the auger; means operatively connecting said assembly to the tractor constituted as straight guides fixed perpendicular to said beam in spaced parallelism, a bar rigid with and transverse of one end of the tractor frame, a thrust plate secured to said bar, a rigid member extending substantially parallel to said bar and thrust plate, means adjacent one end of said member for pivotally connecting said member to said thrust plate in overlying bearing engagement therewith for relative angular adjustment through a vertical arc, a selectively-actuatable screw operatively coupling relatively movable contiguous portions of said plate and said member remote from their pivotal conjunction in regulable determination of their angular correlation, sleeves transverse of said member fixed thereto for sliding coaction with said guides secured to said beam, and a hydraulic ram operatively linking said member and said beam; and connection means for regulably powering the auger drive of the assembly and the ram intercoupling said member and said beam from the hydraulic system of the tractor whereby said assembly is yoked in altitudinally-adjustable and tilt-adjustable relation to the tractor with its auger and scraper blade components presented for ground engagement transversely of the tractor.

References Cited
UNITED STATES PATENTS

| | | | |
|---|---|---|---|
| 2,109,393 | 2/1938 | Le Bleu | 37—108 |
| 2,714,775 | 8/1955 | Crawford | 37—144 |
| 3,035,812 | 5/1962 | Wineteer | 254—2 |
| 3,101,153 | 8/1963 | Verdery | 254—3 XR |
| 3,119,193 | 1/1964 | Herschberger | 37—143 |

ANTONIO F. GUIDA, *Primary Examiner.*

ABRAHAM G. STONE, *Examiner.*

R. L. HOLLISTER, A. E. KOPECKI,
*Assistant Examiners.*